(12) United States Patent
Fukumoto

(10) Patent No.: US 6,344,920 B1
(45) Date of Patent: Feb. 5, 2002

(54) MONOLITHIC SERIAL OPTICAL PARAMETRIC OSCILLATOR

(75) Inventor: Joseph M. Fukumoto, Rancho Palos Verdes, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/478,229

(22) Filed: Jan. 6, 2000

(51) Int. Cl.[7] .............................. G02F 1/39; H01S 3/109

(52) U.S. Cl. ........................................ 359/330; 372/22

(58) Field of Search ................................ 359/326–332; 372/21, 22

(56) References Cited

U.S. PATENT DOCUMENTS

| | | | | |
|---|---|---|---|---|
| 5,274,495 A | * | 12/1993 | Shirasaki | 359/330 |
| 5,371,752 A | * | 12/1994 | Powers et al. | 372/21 X |
| 5,400,173 A | * | 3/1995 | Komine | 359/330 |
| 5,740,190 A | * | 4/1998 | Moulton | 372/22 X |

OTHER PUBLICATIONS

Moore, G. T. et al.: A Simultaneously Phase–Matched Tandem Optical Parametric Oscillator, *IEEE J. Quantum Electronics*, vol. 34, No. 5, May 1998, pp. 803–810.

* cited by examiner

Primary Examiner—John D. Lee
(74) Attorney, Agent, or Firm—Colin M. Raufer; Leonard A. Alkov; Glenn H. Lenzen, Jr.

(57) ABSTRACT

An arrangement (10) for efficiently shifting energy received at a first wavelength and outputting the shifted energy at a second wavelength. The arrangement (10) includes a laser (12) and an optical parametric oscillator (14) of unique design. The oscillator (14) is constructed with a energy shifting crystal (20) and first and second reflective elements (16) and (18) disposed on either side thereof. Light from the laser (12) at a fundament frequency is shifted by the crystal and output at a second wavelength. The second wavelength is a primary emission and induces a secondary emission of energy in the crystal. A novel feature of the invention is a coating applied on the reflective elements (16 and/or 18) for minimizing the secondary emission. This constrains the energy to be output by the arrangement (10) at the wavelength of the desired primary emission. In the alternative, the arrangement (10) may be optimized to output one or more of the secondary emissions.

32 Claims, 4 Drawing Sheets

MONOLITHIC SERIAL OPTICAL PARAMETRIC OSCILLATOR

BACKGROUND OF THE INVENTION

1. Field of the Invention

The present invention relates to energy shifting arrangements. More specifically, the present invention relates to optical parametric oscillators (OPOs) used in eye-safe lasers and other devices.

2. Description of the Related Art

Lasers are currently widely used for communication, research and development, manufacturing, directed energy and numerous other applications. One particularly useful application involves target designation. Laser light is intense and collimated. Accordingly, lasers are favored for target designation inasmuch as they allow a forward observer to designate a target from a considerable and therefore, typically, safe distance with considerable accuracy. That is, since the beam is collimated, it does not spread unacceptably and the intensity of the beam remains high for a considerable distance. Laser target designators have been proven on the battlefield to be a useful aid in the accurate delivery of weapons to target.

An important requirement for target designation and other applications is that the laser be 'eye-safe'. For example, Neodymium-Ytterbium Aluminum Garnet (Nd:YAG) lasers are commonly used for numerous applications including laser target designation. Unfortunately, Nd:YAG devices normally lase at a wavelength of 1.06 $\mu$m (microns), which is harmful to the eye.

Because only a few crystals lase and each lases at a unique fundamental frequency, OPOs have been widely used in designators and other devices to shift the fundamental output of a laser from one wavelength to another. For example, optical parametric oscillators (OPOs) have been used to shift laser output from the harmful wavelength of 1.06 microns output by Nd:YAG lasers to the eye-safe range of 1.53 microns.

OPOs use a nonlinear crystal to effect a shift of energy from one part of the spectrum to another. One frequently used crystal is potassium titanyl arsenate (KTA). Unfortunately, the use of OPOs limits the efficiency of the system. This is due to the fact that the energy in the input laser beam is split between plural output beams, only one of which is 'eye-safe'. This operates as a system constraint in many applications. For example, in the target designation application, the inefficiencies associated with the OPO conversion process adversely impact the size, cost, power requirements, weight and range of the system.

Hence, there is a need in the art for a more efficient system and method for shifting the energy output of a laser by other wavelength conversion pathways.

SUMMARY OF THE INVENTION

The need in the art is addressed by the system and method of the present invention. In a most general sense, the invention is an arrangement comprising a mechanism for shifting energy received at a first wavelength and outputting the shifted energy at a second wavelength. The second wavelength is a primaly emission capable of inducing a secondary emission of energy in the shifting medium. Hence, a novel feature of the invention is the inclusion of a second mechanism, in functional alignment with the first mechanism, for minimizing the secondary emission. This constrains the energy to be output by the arrangement at the desired wavelength.

In the illustrative embodiment, the first mechanism is an optical parametric oscillator having a crystal such as potassium titanyl arsenate. The crystal may be X-cut, Y-cut, etc. The second mechanism then includes first and second reflective elements. The first element is a first surface reflective at the second wavelength with a predetermined reflectivity at a wavelength of the secondary emission. Similarly, the second element is a second surface at least partially transmissive at the second wavelength with a predetermined reflectivity at a wavelength of the secondary emission. Optimally, the predetermined reflectivity of the secondary emission from both mirror surfaces is less than or equal to five percent.

In one embodiment illustrated herein, the first wavelength is approximately 1.06 microns, the second wavelength is approximately 1.53 microns and the secondary emission includes energy at 2.59 microns and 3.76 microns.

The present teachings enable the design and construction of efficient eye-safe lasers and other devices as will be appreciated by those of ordinary skill in the art.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
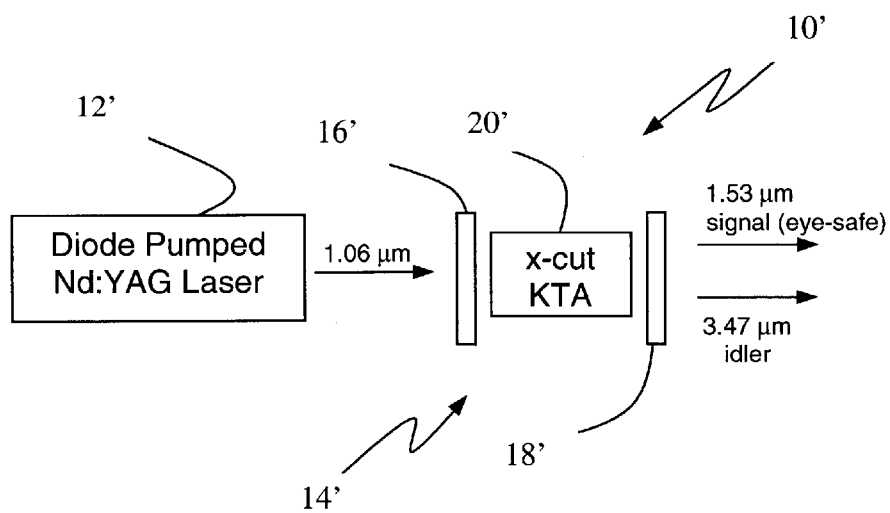
FIG. 1 is a diagram depicting a laser-based system for generating eye-safe wavelengths in accordance with conventional teachings.

FIG. 1 is a diagram depicting a laser-based system for generating eye-safe wavelengths in accordance with conventional teachings. The system 10' includes a laser, such as a diode pumped Nd:YAG laser 12', which outputs a collimated beam of electromagnetic energy at a fundamental frequency of 1.06 $\mu$m. This 1.06 $\mu$m beam is applied to an optical parametric oscillator (OPO) 14' consisting of a crystal nonlinear medium 20' sandwiched between a rear high reflector 16' and an output coupler 18'. Eye-safe wavelength generation in the OPO 14' typically uses Type II non-critically phase matched, x-cut potassium titanyl arsenate (KTA) as the non-linear medium. Although the crystal 20' is a Type II non-critically phase matched, x-cut KTA in the illustration, those skilled in the art will appreciate that the secondary effect discussed below is not limited thereto.

As is known in the art, in response to the application of a 1.06 μm pump beam thereto, the crystal 20' generates an eye-safe 1.53 μm signal wave and 3.47 μm idler wave. This is known as a 'primary process'.

However, not generally known in the art is the fact that as a result of this primary process, which is a serial process, a 'secondary process' occurs and is due to the feedback of the 1.54 μm wave into the crystal by the reflectors 16' and 18' at the x-cut angle, an angle along one of the primary axes of the crystal. (KTA and other crystals used for OPOs are 'angle tunable'. That is, the angle of the input beam relative to the crystal's axes determines the wavelength of the output beam.) The secondary OPO process produces distinct signal and idler waves that are of longer wavelengths than those of the first OPO process. This is due to the fact that even a small amount of reflectivity (i.e., <10%) from either the crystal anti-reflection coatings or the OPO mirrors at the secondary OPO signal wavelength can initiate oscillations at the secondary signal wavelength due to high gain and large acceptance angles of the secondary process. The crystal responds by generating the secondary signal and idler waves.

It is also possible to generate angle tunable, secondary process signal and idler waves that are critically phase matched. However, the overall conversion efficiency of generating these waves will be reduced due to walk-off and reduced non-linear gains.

Figure 2:
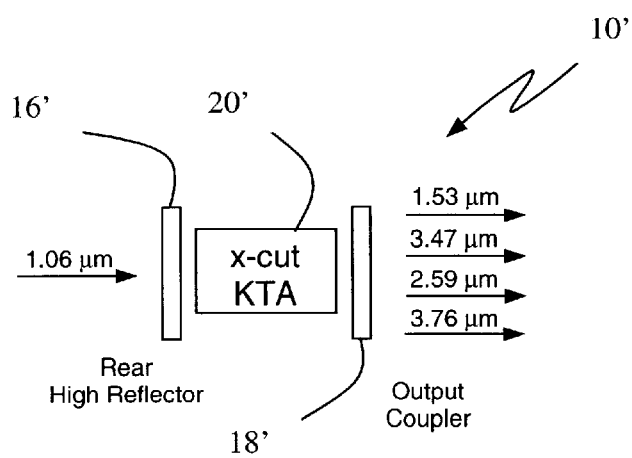
FIG. 2 depicts the secondary process caused by the primary process depicted in FIG. 1.

In the illustration of FIG. 1, for example, the secondary process can transform some fraction of the eye-safe signal wave of the primary OPO process into secondary signal and idler waves at 2.59 μm and 3.76 μm, respectively. This is shown in the simplified diagram of FIG. 2, which depicts the newly discovered secondary process caused by the primary process depicted in FIG. 1.

The present teachings allow one to a) minimize the effect of the secondary OPO process in non-critically phase matched OPOs by conscientious design of crystal anti-reflection coatings and OPO mirror coatings so that the primary process can proceed with maximum efficiency or b) maximize the secondary OPO process by conscientious design of crystal anti-reflection coatings and OPO mirror coatings if the secondary signal and idler wave outputs are of interest.

A novel scheme is disclosed herein whereby the secondary serial OPO process is phase matched, provides significant gain, and uses the eye-safe signal wave as a pump for a second OPO process in the same crystal. A novel monolithic serial OPO design is disclosed which can be used to efficiently generate one to four distinct wavelengths with a single input pump wavelength in a single non-linear crystal such as non-critically phase matched, x-cut potassium titanyl arsenate.

Those skilled in the art with access to the present teachings will appreciate that:
  a) a secondary serial OPO process producing a new set of distinct signal and idler waves exists due to high non-linear gain and large acceptance angle in OPOs which use non-critically phase matched, bi-axial crystals such as x-cut KTA or its isomorhps;
  b) by conscientiously designing multiple wavelength coatings for the rear high reflector and output coupler of a non-critically phase matched OPO, the secondary OPO process can be minimized and the first process optimized to produce greater energy conversion efficiency to either the eye-safe signal or idler wavelengths in the first process; and
  c) by conscientiously designing multiple wavelength coatings for the rear high reflector and output coupler of a non-critically phase matched OPO, the secondary process can be optimized at the expense of the signal wave of the first process, if the secondary OPO process signal and idler wavelengths are of interest.

The present teachings are appreciated with reference to FIGS. 3–7.

Figure 3:
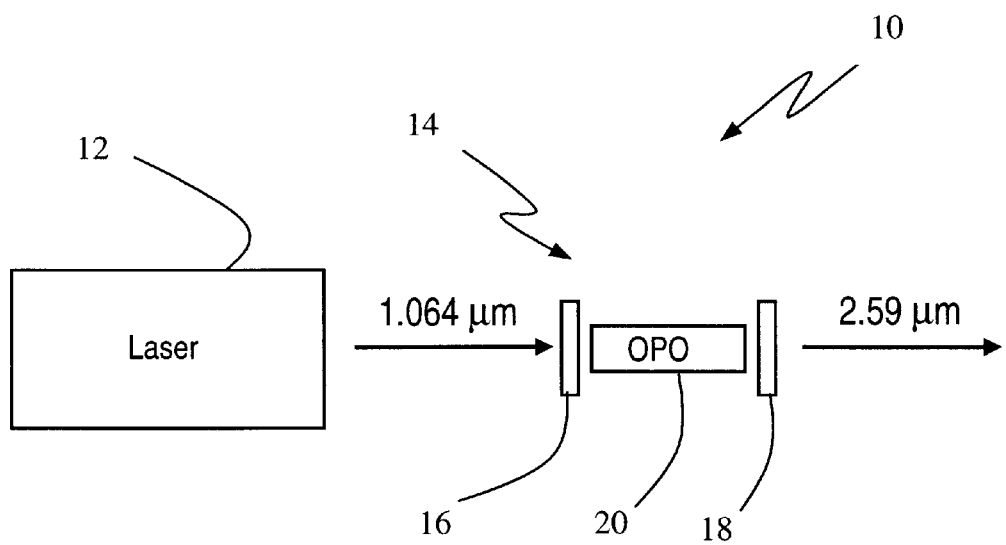
FIG. 3 is a diagram of an arrangement constructed in accordance with the teachings of the present invention.

FIG. 3 is a diagram of an arrangement implemented in accordance with the present teachings. As per the conventional implementation of FIG. 1, the system 10 of FIG. 3 includes a laser 12 and an OPO 14. The OPO 14 includes a frequency shifting medium such as a crystal 14 sandwiched between a rear reflector 16 and an output coupler 18. The system 10 is similar to the system 10' of FIG. 1 with the exception that the rear reflector 16 and the output coupler 18 are designed to allow transmission of 2.59 μm and 3.76 μm beams (as is the case with CaF$_2$). Because the more typical mirror substrates such as BK7 and fused silica may absorb some of the 2.59 μm and 3.76 μm beams, use of OPO mirrors fabricated from CaF$_2$ will allow clear transmission of the secondary process waves for diagnostic purposes. (The two waves may be isolated and detected with a spectrometer and detector. Because of bulk absorption losses in the crystal at 3.76 μm, it may be more difficult to resonate the secondary process at 3.76 μm.) In the preferred embodiment, the reflector 16 and coupler 18 are optical thin films disposed on a substrate to provide a mirrored surface. Those skilled in the art will appreciate that any suitable thin film design may be used for this purpose so tong as the reflectivity of at least one of the mirrors to energy resulting from the secondary emission is low (e.g., in the range of five percent or less). One or more of the reflective surfaces 16 and/or 18 may be coated to pass, leak or absorb one or more of the secondary emissions (2.59 μm or 3.76 μm) as discussed more fully below.

With knowledge of the existence of the secondary OPO process, one can design both mirrors and crystal anti-reflection coatings to be as transmissive at 2.59 μm and 3.76 μm as possible if the secondary process is to be minimized, and the primary process maximized. This is illustrated in FIG. 4, where the secondary process signal and idler waves are maximally transmitted by both OPO mirrors and KTA crystal anti-reflective coating.

Figure 4:
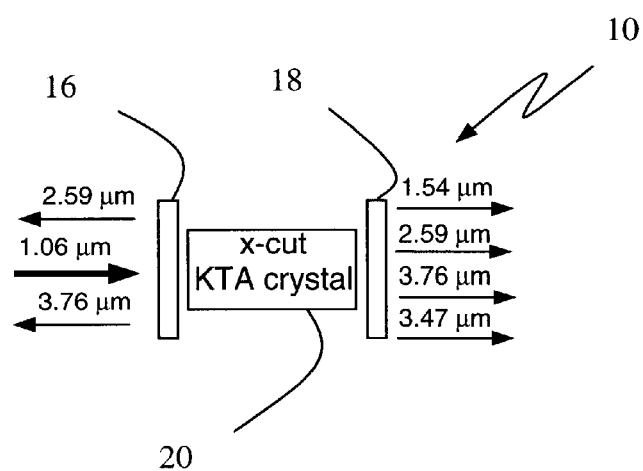
FIGS. 4 and 5 are simplified diagrams that illustrate an alternative embodiment of an optical parametric oscillator constructed in accordance with the present teachings.
Figure 5:
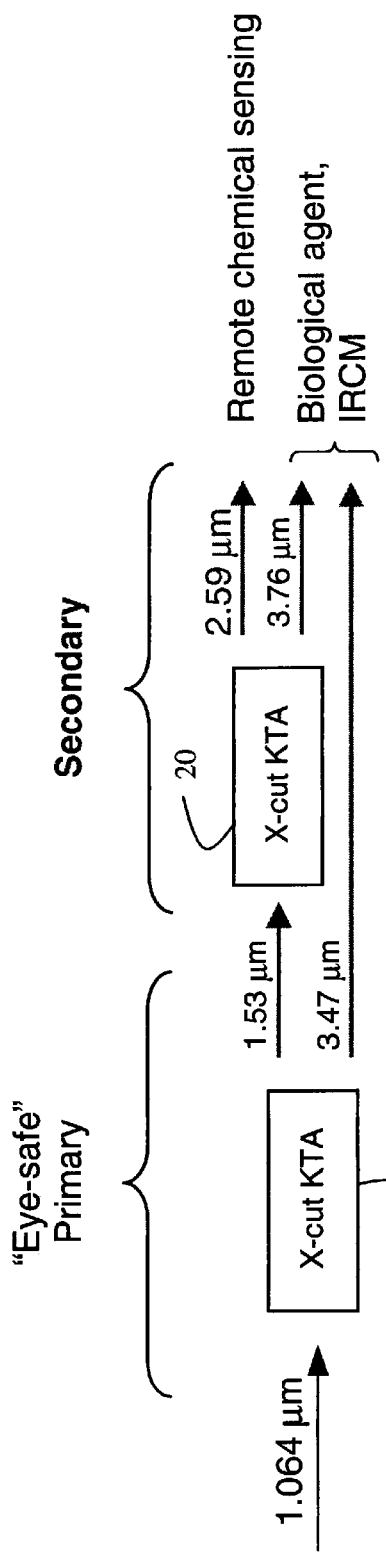

FIGS. 4 and 5 are simplified diagrams that illustrate an application of an optical parametric oscillator constructed in accordance with the present teachings. In FIG. 4, the laser 12 has been omitted for simplicity. In FIG. 5, the reflective elements 16 and 18 have also been omitted for clarity.

Figure 6:
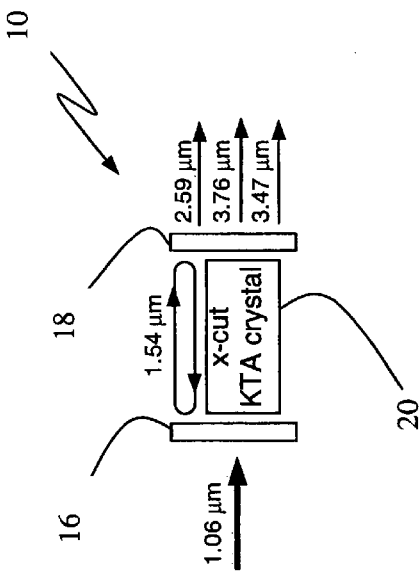
FIG. 6 is a diagram that illustrates that in accordance with present teachings, for applications which can use the secondary signal and/or idler waves, the first process signal wave can be fully contained by the OPO.

FIG. 6 illustrates that for applications which can use the secondary signal and/or idler waves, the first process signal wave can be fully contained by the OPO 14 (by specifying high reflectivity at the first signal wavelength for both the rear reflector and output coupler, in the example above) and providing full reflectivity for 2.59 μm for the rear reflector and partial reflectivity at 2.59 μm for the output coupler 18. In this manner, the 1.54 μm pump wave for the secondary process is fully contained while the 2.59 μm signal wave for the secondary process is allowed to oscillate. (See FIG. 6.)

In FIG. 5, note that only a single crystal 20 is used, not two separate crystals. Nonetheless, those skilled in the art will appreciate that the present teachings may be extended to any number of mediums or crystals arranged in serial (cascade) or parallel configurations or any combination thereof without departing from the scope of the present teachings.

As shown in FIG. 5, the secondary process may be optimized in the manner discussed above to output strong beams at 2.59 µm, 3.76 µm and 3.47 µm for numerous applications including remote chemical sensing, biological agent detection and/or infrared countermeasure (IRCM) applications utilizing the teachings of the present invention. In connection with the discussion above, the secondary process is minimized by preventing oscillation of the secondary signal and/or idler waves by careful design of the OPO mirror and crystal coatings. Nonetheless, it is optimized in the forward direction by being output by the output coupler 18 only, instead of being output by both the coupler 18 and the rear reflector 16.

Figure 7A:
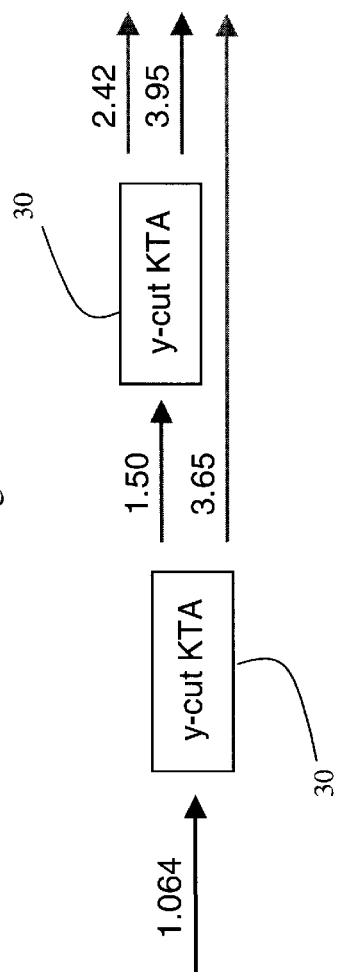
FIGS. 7a–c depict a few additional alternative implementations of OPOs made possible by the teachings of the present invention.
Figure 7B:
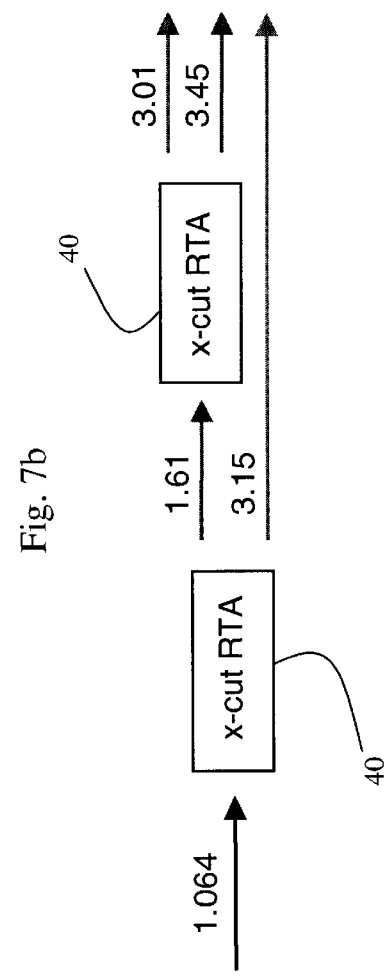
Figure 7C:
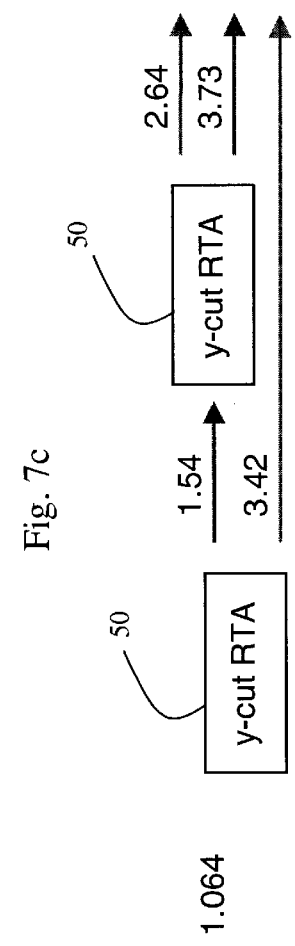

FIGS. 7a–c depict a few alternative implementations of OPOs possible with the teachings of the present invention. In FIG. 7a, the reflective surfaces 16 and 18 (not shown) are coated so that when a 1.064 µm fundamental beam is applied to a y-cut KTA crystal 30, a primary process occurs which generates a signal wave at 1.50 µm and an idler wave at 3.65 µm. The reflective elements 16 and 18 (not shown) are coated to contain the primary signal wave at 1.50 and pass beams at 2.42 and 3.95 µm due to a secondary emission therefrom.

FIG. 7b shows an arrangement designed to generate output beams at 3.01, 3.45 and 3.15 µm from an x-cut RTA crystal 40.

FIG. 7c shows an arrangement designed to generate output beams at 2.64, 3,73 and 3.42 µm from a y-cut RTA crystal 50. The non-linear crystal KTP will also generate secondary signal and idler wavelengths in a fashion similar to the above examples.

In each of the implementations of FIGS. 7a–c, the reflective elements 16 and 18 are coated to contain energy at the primary process signal wavelengths and emit energy at the wavelengths shown. Those skilled in the art will be able to design reflective elements using optical thin films or other techniques known in the art and the invention is not limited to the design thereof. A key consideration is that if the secondary process is to be minimized (and hence the primary process maximized), the combined reflectivity of both reflective surfaces must be low (e.g., less than 5 or 10%) to those frequencies in the secondary emission as required by the application.

Those skilled in the art will recognize that the present teachings are believed to provide the following potential advantages over existing technology: a) efficiency of eye-safe lasers may be increased providing for lower cost units in production and smaller unit size and weight; b) efficiency of secondary or multiple-stage OPOs may be enhanced for applications in remote chemical sensing, biological agent detection. pollution monitoring, infrared countermeasures, and other laser-based applications in the mid- and far-infrared regions.

Thus, the present invention has been described herein with reference to a particular embodiment for a particular application. Those having ordinary skill in the art and access to the present teachings will recognize additional modifications, applications and embodiments within the scope thereof. For example, the present teachings are not limited to use with lasers. Any source of an input wave or beam of electromagnetic energy may be used such as microwave by way of example. In addition, the invention is not limited to use of a crystal as a shifting medium. The present teachings may be used with any medium which shifts energy and generatessecondary emissions including without limitation r-cut crystals. Further, the present teachings are not limited to use optical thin film reflective elements. Any surface which serves to eliminate unwanted energy from the medium may be used for this purpose.

It is therefore intended by the appended claims to cover any and all such applications, modifications and embodiments within the scope of the present invention.

Accordingly,

What is claimed is:

1. An arrangement comprising:
   first means for shifting energy received at a first wavelength and outputting said shifted energy at a second wavelength, said second wavelength resulting from a primary process and being capable of inducing a secondary process by which a secondary emission is generated by said first means and
   second means disposed in functional alignment with said first means for minimizing said secondary emission thereby.

2. The invention of claim 1 wherein said second means includes first and second reflective means.

3. The invention of claim 2 wherein said first reflective means is a first surface reflective at said second wavelength with a predetermined reflectivity at a wavelength of the secondary emission.

4. The invention of claim 3 wherein said predetermined reflectivity is less than or equal to five percent.

5. The invention of claim 3 wherein said second means includes a second mirror at least partially transmissive at said second wavelength with a predetermined reflectivity at a wavelength of the secondary emission.

6. The invention of claim 5 wherein said predetermined reflectivity is less than or equal to five percent.

7. The invention of claim 1 wherein said first means is a crystal.

8. The invention of claim 7 wherein said crystal is X cut.

9. The invention of claim 7 wherein said crystal is Y cut.

10. The invention of claim 7 wherein said crystal is potassium titanyl arsenate.

11. The invention of claim 10 wherein said first wavelength is approximately 1.06 microns, said second wavelength is approximately 1.53 microns and said secondary emission includes energy at 2.59 microns.

12. The invention of claim 10 wherein said first wavelength is approximately 1.06 microns, said second wavelength is approximately 1.53 microns and said secondary emission includes energy at 3.76 microns.

13. An optical parametric oscillator comprising:
   a crystal adapted to shift energy received at a first wavelength and output said shifted energy at a second wavelength, said second wavelength being a primary emission resulting from a primary process and being capable of inducing a secondary emission of energy by said crystal resulting from a secondary process and
   a mechanism disposed in functional alignment with said crystal for minimizing said secondary emission thereby.

14. The invention of claim 13 wherein said mechanism includes first and second reflective means.

15. The invention of claim 14 wherein said first reflective means is a first surface reflective at said second wavelength with a predetermined reflectivity at a wavelength of the secondary emission.

16. The invention of claim 15 wherein said predetermined reflectivity is less than or equal to five percent.

17. The invention of claim 15 wherein said mechanism includes a second mirror at least partially transmissive at said second wavelength with a predetermined reflectivity at a wavelength of the secondary emission.

18. The invention of claim 17 wherein said predetermined reflectivity is less than or equal to five percent.

19. The invention of claim 13 wherein said crystal is X cut.

20. The invention of claim 13 wherein said crystal is Y cut.

21. The invention of claim 13 wherein said crystal is potassium titanyl arsenate.

22. The invention of claim 21 wherein said first wavelength is approximately 1.06 microns, said second wavelength is approximately 1.53 microns and said secondary emission includes energy at 2.59 microns.

23. The invention of claim 21 wherein said first wavelength is approximately 1.06 microns, said second wavelength is approximately 1.53 microns and said secondary emission includes energy at 3.76 microns.

24. An optical parametric oscillator comprising:

a crystal adapted to shift energy received at a first wavelength and output said shifted energy at a second wavelength, said second wavelength being a primary emission resulting from a primary process and being capable of inducing a secondary emission of energy by said crystal associated with a secondary process and a mechanism disposed in functional alignment with said crystal for minimizing said secondary emission thereby, said mechanism including first and second reflective surfaces, said first surface being reflective at said second wavelength and said second surface being at least partially transmissive at said second wavelength, at least one of said surfaces having less than or equal to five percent reflectivity at a wavelength of the secondary emission.

25. The invention of claim 24 wherein said crystal is potassium titanyl arsenate.

26. The invention of claim 25 wherein said first wavelength is approximately 1.06 microns, said second wavelength is approximately 1.53 microns and said secondary emission includes energy at 2.59 microns.

27. The invention of claim 26 wherein said crystal is X cut.

28. The invention of claim 26 wherein said crystal is Y cut.

29. The invention of claim 25 wherein said first wavelength is approximately 1.06 microns, said second wavelength is approximately 1.53 microns and said secondary emission includes energy at 3.76 microns.

30. A mechanism for outputting energy comprising:

first means for generating energy at a first wavelength and second means for shifting the energy output by said first means, said second means including:

third means for shifting energy received by said second means at a first wavelength and outputting said shifted energy at a second wavelength, said second wavelength being a primary emission associated with a primary process and being capable of inducing a secondary emission of energy by said third means associated with a secondary process and fourth means disposed in functional alignment with said third means for minimizing said secondary emission thereby.

31. An eye-safe laser comprising:

a laser for outputting a beam having energy outside of an eye-safe range and an optical parametric oscillator in alignment with said laser including:

a crystal adapted to shift energy received from said laser at a first wavelength and output said shifted energy at a second wavelength, said second wavelength being a primary emission associated with a primary process and being capable of inducing a secondary emission of energy by said crystal associated with a secondary process thereof and a mechanism disposed in functional alignment with said crystal for minimizing said secondary emission thereby.

32. A method for efficiently generating energy at a desired first wavelength including the steps of:

generating energy at said first wavelength;

shifting the energy and outputting said shifted energy at a second wavelength, said second wavelength being a primary emission associated with a primary process and being capable of inducing a secondary emission of energy associated with a secondary process; and minimizing said secondary emission.

* * * * *